United States Patent
Hiriyannaiah et al.

(10) Patent No.: US 10,416,470 B2
(45) Date of Patent: Sep. 17, 2019

(54) IMAGING SYSTEMS AND METHODS INCLUDING OBSCURANT CHARACTERIZATION

(71) Applicant: L3 CINCINNATI ELECTRONICS CORPORATION, Mason, OH (US)

(72) Inventors: Harish P. Hiriyannaiah, West Chester, OH (US); Nansheng Tang, Mason, OH (US)

(73) Assignee: L3 CINCINNATI ELECTRONICS CORPORATION, Mason, OH (US)

( * ) Notice: Subject to any disclaimer, the term of this patent is extended or adjusted under 35 U.S.C. 154(b) by 0 days.

(21) Appl. No.: 15/798,766

(22) Filed: Oct. 31, 2017

(65) Prior Publication Data

US 2018/0052333 A1 Feb. 22, 2018

Related U.S. Application Data

(63) Continuation of application No. 15/435,721, filed on Feb. 17, 2017, now Pat. No. 9,824,295.

(60) Provisional application No. 62/296,834, filed on Feb. 18, 2016.

(51) Int. Cl.
   *G02B 5/30* (2006.01)
   *G02B 27/28* (2006.01)
   *G06K 9/20* (2006.01)
   *G02B 5/20* (2006.01)
   *G02B 26/00* (2006.01)
   *G06K 9/62* (2006.01)
   *G06K 9/78* (2006.01)

(52) U.S. Cl.
   CPC ........... *G02B 27/281* (2013.01); *G02B 5/201* (2013.01); *G02B 26/008* (2013.01); *G02B 27/286* (2013.01); *G02B 27/288* (2013.01); *G06K 9/209* (2013.01); *G06K 9/2027* (2013.01); *G06K 9/62* (2013.01); *G06K 9/6201* (2013.01); *G06K 9/78* (2013.01); *G02B 5/30* (2013.01)

(58) Field of Classification Search
   CPC .... G02B 27/281; G02B 5/201; G02B 26/008; G06K 9/62; G06K 9/209; G06K 9/78
   USPC ........................................ 356/438, 432, 364
   See application file for complete search history.

(56) References Cited

U.S. PATENT DOCUMENTS

| | | | | |
|---|---|---|---|---|
| 4,475,816 A | * | 10/1984 | Mooradian | G01N 21/534 356/338 |
| 4,924,095 A | * | 5/1990 | Swanson, Jr. | G01N 21/3504 250/338.1 |
| 5,489,777 A | * | 2/1996 | Stedman | G01J 5/602 250/338.5 |
| 5,498,872 A | * | 3/1996 | Stedman | G01N 21/33 250/338.5 |

(Continued)

*Primary Examiner* — Roy M Punnoose
(74) *Attorney, Agent, or Firm* — Dinsmore & Shohl LLP (57) ABSTRACT

Systems and methods for characterizing an obscurant and imaging a target are disclosed. In one embodiment, a method of imaging a target includes characterizing at least one obscurant present in an environment, and determining, based on the at least one characterized obscurant, one or more of the following: one or more wavelengths corresponding to the at least one obscurant, a polarization state corresponding to the at least one obscurant, and a sensor exposure time corresponding to the at least one obscurant. The method further includes adjusting one or more parameters of an imagining system based at least in part on a characterization of the at least one obscurant.

26 Claims, 5 Drawing Sheets (56) References Cited

U.S. PATENT DOCUMENTS

| | | | |
|---|---|---|---|
| 6,694,159 B2 * | 2/2004 | Hall | A61B 5/0059 250/252.1 |
| 6,882,409 B1 | 4/2005 | Evans et al. | |
| 7,142,304 B1 * | 11/2006 | Barbour | G01N 21/4795 356/432 |
| 7,369,229 B2 | 5/2008 | Bissett, III et al. | |
| 7,616,984 B2 * | 11/2009 | Barbour | A61B 5/0073 250/332 |
| 7,750,802 B1 * | 7/2010 | Parish | G01N 21/64 250/370.01 |
| 8,102,306 B2 | 1/2012 | Smith, Jr. et al. | |
| 8,218,146 B2 * | 7/2012 | Rogers | G01N 21/3504 356/326 |
| 8,330,957 B2 * | 12/2012 | Hager | G01N 21/33 356/438 |
| 2004/0252300 A1 * | 12/2004 | Slater | G01J 3/42 356/318 |
| 2005/0151965 A1 * | 7/2005 | Bissett, III | G01J 3/28 356/328 |
| 2006/0021498 A1 | 2/2006 | Moroz et al. | |
| 2008/0180655 A1 * | 7/2008 | Bruch | G01J 3/10 356/73 |
| 2015/0116712 A1 * | 4/2015 | Otani | G01N 21/21 356/364 |
| 2015/0369693 A1 * | 12/2015 | Morris | G01M 3/38 356/437 |

\* cited by examiner

IMAGING SYSTEMS AND METHODS INCLUDING OBSCURANT CHARACTERIZATION

CROSS REFERENCE TO RELATED APPLICATIONS

This application is a continuation of U.S. patent application Ser. No. 15/435,721 entitled "Imagining Systems and Methods Including Obscurant Characterization" and filed on Feb. 17, 2017, which claims priority to U.S. Provisional Patent Application No. 62/296,834 entitled "Systems and Methods for Imaging Through Obscurants" and filed on Feb. 18, 2016, the entirety of which are incorporated by reference herein.

BACKGROUND

Field

The present specification generally relates to imaging systems and, more particularly, to imaging systems that dynamically characterize one or more obscurants within an environment to increase the signal to noise ratio and extract the signal effectively.

Technical Background

Imaging systems utilize a sensor comprising an array of pixels to create a digital image of a scene. Optical radiation that is either emitted by a target or reflected by the target is received by the imaging system as optical radiation signal representing the target. However, obscurants present between the imaging system and the target may obscure the target by scattering optical radiation and creating noise by their own self-emissions and scattering from other radiation sources, in addition to attenuating the signal optical radiation through absorption or scattering. Obscurants may include, but are not limited to, smoke, sand/dust, fog, rain, clouds, snow, and smog. Optical radiation, such as light from the sun, may be reflected and redirected by particles of the obscurant, which is then received by the imaging system as noise. In some instances, the target may be substantially obscured by the obscurant due to significant noise optical radiation and resulting in low signal to noise ratio.

Accordingly, a need exists for alternative imaging systems that can image a target through one or more obscurants by increasing a signal to noise ratio.

SUMMARY

According to one embodiment, an imaging system includes a sensor comprising an array of pixels, each individual pixel of the array of pixels configured to detect optical radiation, and a multispectral filter disposed within an optical path of the sensor. The multispectral filter has a plurality of filters. Each individual filter of the plurality of filters is transmissive to optical radiation having a wavelength within a wavelength range. The imaging system further includes a polarizing filter disposed within the optical path of the sensor, wherein the polarizing filter is capable of filtering optical radiation at a plurality of polarization states, a processor, and a non-transitory computer-readable medium storing instructions that, when executed by the processor, causes the processor to characterize at least one obscurant that is present within an environment. The instructions further cause the processor to, based at least on a obscurant characterization, perform one or more of the following: adjust the multispectral filter, apply a selected polarization state of the polarizing filter, and select an exposure time for the sensor.

In another embodiment, a method of imaging a target includes characterizing at least one obscurant present in an environment, and determining, based on the at least one characterized obscurant, one or more of the following: one or more wavelengths corresponding to the at least one obscurant, a polarization state corresponding to the at least one obscurant, and a sensor exposure time corresponding to the at least one obscurant. The method further includes adjusting one or more parameters of an imagining system based at least in part on a characterization of the at least one obscurant.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to systems and methods for characterizing an obscurant present within an environment, and selectively adjusting various parameters of an imaging system in accordance with the characterization of the obscurant. Parameters may include, but are not limited to, a wavelength parameter, a polarization parameter, and an exposure time parameter. By selectively adjusting the various parameters of the imaging system to account for the obscurant, a signal to noise ratio of the imaging system is increased by suppressing noise and enhancing the signal from the target and background. In this manner, the presence of the obscurant may appear to be reduced as sensed by the imaging system. In some embodiments, a target is actively illuminated by a laser beam that is configured to having parameters based on the characterization of the obscurant such that it may optimally pass through the obscurant. For example, the laser beam may having a wavelength and polarization state that limit scattering and absorption as it passes through the obscurant, illuminates the scene and target, improving the return signal from the target and background.

Various embodiments of systems and methods for characterizing one or more obscurants and adjusting imaging system parameters are described in detail below.

Figure 1:
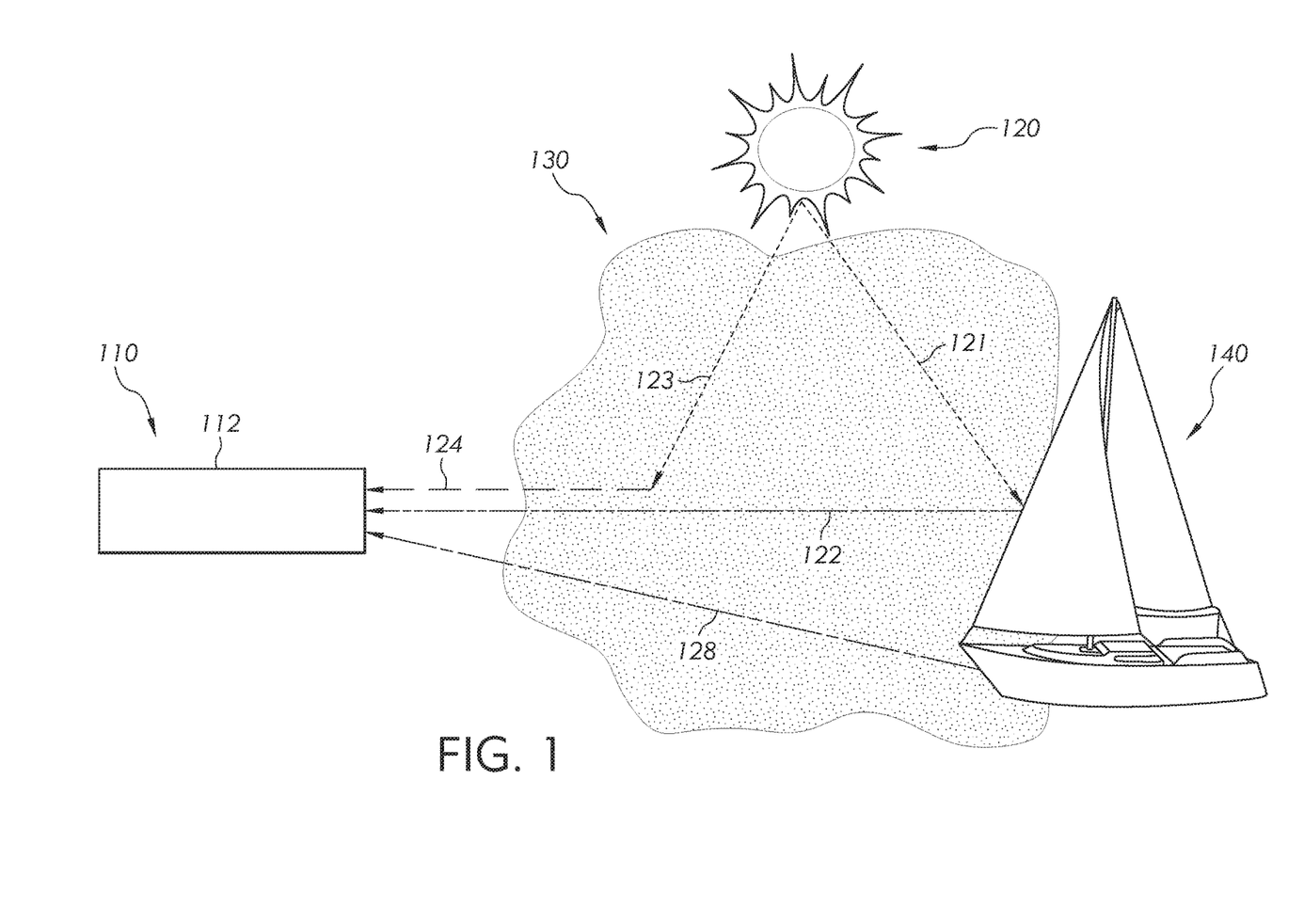
FIG. 1 schematically depicts an obscurant that is present between an imaging system and a target.

Referring now to FIG. 1, an example imaging system 110 comprising a sensor 112 (e.g., an image sensor) is schematically illustrated as being deployed within an environment. In the example, an obscurant 130 is located between the imaging system 110 and a target 140, which is illustrated as a boat. Thus, the imaging system 110 is attempting to image the target 140 through the obscurant 130. It should be understood that the target 140 may be any object or objects of interest.

The obscurant 130 may be any material present between the imaging system 110 and the target 140 that reduces the signal and/or increases the noise received by the imaging system 110, thereby obscuring the target 140. As non-limiting examples, the obscurant 130 may be one or more of smoke, sand/dust, fog, rain, clouds, snow, and smog. As shown in FIG. 1, the obscurant 130 reduces the signal to noise ratio of the imaging system 110 with respect to the target 140. An illumination source 120 emits optical radiation 121 that is incident on the target 140, which is then reflected as signal optical radiation 122 that is received by sensor 112 of the imaging system 110 as signal data. The illumination source 120 may be any source that emits optical radiation, such as, without limitation, the sun, moon, artificial lighting, emissivity from the atmosphere itself, and any thermal emissions from any warm body in the atmosphere. The target 140 may emit signal optical radiation 128 itself independent of the illumination source 120 (i.e., thermal emission). The illumination source 120 also emits optical radiation 123 that is reflected by particles of the obscurant 130. The reflected optical radiation is noise optical radiation 124 that may be received by the sensor 112 of the imaging system 110. An increase in noise optical radiation 124 decreases the signal to noise ratio of the imaging system 110. Further, signal optical radiation 122 reflected or emitted by the target may be absorbed or scattered by the obscurant, thereby reducing the signal optical radiation that reaches the imaging system 110. A low signal to noise ratio may cause the target 140 to be completely invisible to the imaging system 110.

As noted above, there is a wide variety of types of obscurants that may be present in the atmosphere. The particles of the different types of obscurants may affect propagation of optical radiation in different ways. For example, the propagation path of optical radiation having a first wavelength may be affected by a particular type of obscurant in a manner that is different than optical radiation having a second wavelength. Additionally, optical radiation having a first polarization state may be affected by a particular type of obscurant in a manner that is different than optical radiation having a second polarization state.

There are variations in obscurant properties within each type of obscurant. For example, particle size, particle density, and particle composition may all affect how optical radiation propagates through the obscurant. Further, more than one type of obscurant may present within the environment. Even further, properties of the obscurant may vary in different regions, manifested as different portions of the field of view (i.e., scene) as seen by the imaging system 110. As a non-limiting example, particle density of the obscurant may be greater closer to the ground or water than at a distance from the ground or water. Thus, optical radiation may propagate differently in various regions of the obscurant.

Embodiments of the present disclosure characterize the obscurant 130 present within the environment, and adjust one or more parameters of the imaging system 110 to increase the signal to noise ratio of the imaging system 110 and, therefore, the visibility of the target(s) 140. As described in more detail below, the one or more parameters of the imaging system 110 include, but are not limited to, spectral, polarimetric, temporal, and spatial parameters.

Figure 2:
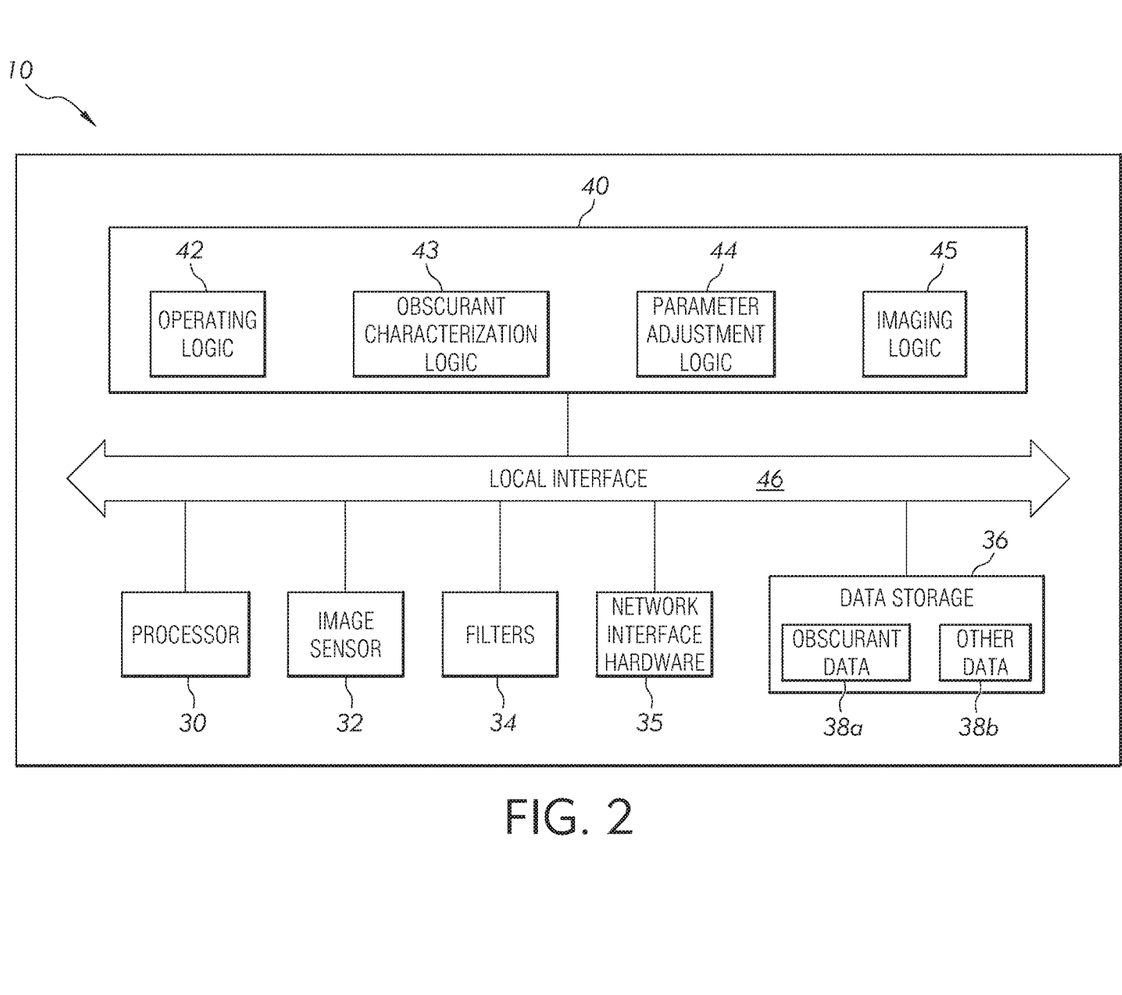
FIG. 2 schematically depicts internal components of an example imaging system according to one or more embodiments described and illustrated herein.

Referring now to FIG. 2, an example imaging system 10 for imaging a target is schematically illustrated. It should be understood that the components illustrated in FIG. 2 may be disposed within a single housing, or may be multiple, distributed components that are communicatively coupled. FIG. 2 illustrates an imaging system 10 for creating digital images of objects within an environment. As described in more detail below, the imaging system 10 includes a non-transitory computer-readable medium storing instructions for characterizing an obscurant present within an environment and controlling components of the imaging system to adjust parameters to account for the characterization of the obscurant. The functionalities described herein may be embodied as hardware, software, and/or firmware, according to embodiments shown and described herein. It should be understood that the software, hardware, and/or firmware components depicted in FIG. 2 may also be provided in one or more computing devices (not shown) that are remote from the imaging system 10.

The imaging system 10 may include a processor 30, a sensor 32, image filters 34, network interface hardware 35, a data storage component 36 (which may store obscurant data 38a (e.g., a library of historical obscurant data) and other data 38b), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, obscurant characterization logic 43, parameter adjustment logic 44, and imaging logic 45 (each of which may be embodied as computer readable program code, firmware, or hardware, as an example). A local interface 46 is also included in FIG. 2 and may be implemented as a bus or other interface to facilitate communication among the components of the imaging system 10. The local interface 46 may include other local networking capabilities to connect the various components of imaging system 10.

The processor 30 may include any processing component configured to receive and execute computer readable code instructions (such as from the data storage component 36 and/or memory component 40). The sensor 32 may be any sensor capable of detecting optical radiation within a desired wavelength band. As non-limiting examples, the sensor 32 may be capable of detecting optical radiation in the ultraviolet spectrum, the visible spectrum, or the infrared spectrum (i.e., the short-wave infrared spectrum, the mid-wave infrared spectrum, and/or the long-wave infrared spectrum). The sensor 32 may comprise a plurality of pixels operable to detect optical radiation that is then processed to form a digital image using the imaging logic 45. In one non-limiting example, the sensor 32 is a focal plane array comprising an array of detector devices (i.e., pixels) capable of detecting optical radiation in the infrared spectrum. In some embodiments, the sensor 32 may be multi-band such that it may selectively receive and detect optical radiation in two or more spectral bands (e.g., short-wave infrared and mid-wave infrared).

The network interface hardware 35 may include any wired or wireless networking hardware, such as a modem, LAN port, wireless fidelity (Wi-Fi) card, WiMax card, mobile communications hardware, and/or other hardware for communicating with other networks and/or devices. For example, the imaging system 10 may be communicatively coupled to other remote electronics systems by the network interface hardware 35.

It should be understood that the data storage component 36 may reside local to and/or remote from the imaging system 10, and may be configured to store one or more pieces of data for access by the imaging system and/or other components. As illustrated in FIG. 2, the data storage component 36 may store obscurant data, which in at least one embodiment is stored as an obscurant library including a plurality of obscurant characterizations and associated imaging system parameters based on historical data. As described in more detail below, the obscurant data may be used by the imaging system to adjust parameters in accordance with one or more obscurants that are present within the environment. The obscurant data 38a may be stored in one or more data storage devices. In another embodiment, the imaging system 10 may be coupled to a remote server or data storage device that comprises obscurant data (e.g., an obscurant library). Other data 38b may be stored in the data storage component 36 to provide support for functionalities described herein.

Included in the memory component 40 may be the operating logic 42, the obscurant characterization logic 43, parameter adjustment logic 44, and imaging logic 45. The operating logic 42 may include an operating system and/or other software for managing components of the imaging system. The obscurant characterization logic 43 may reside in the memory component 40 and may be configured to facilitate the various methods of obscurant characterization as describe in detail below. The parameter adjustment logic 44 may be configured to adjust various parameters of the imaging system (e.g., various filters, exposure time, and the like) based at least in part on the characterization of one or more obscurants. The imaging logic 45 may be configured to receive sensor data from the pixels of the sensor 32 and create a digital image of a scene.

As noted above, it should be understood that the components illustrated in FIG. 2 are merely exemplary and are not intended to limit the scope of this disclosure. More specifically, while the components in FIG. 2 are illustrated as residing within a single housing, this is a non-limiting example. In some embodiments, one or more of the components may reside external to the imaging system 10.

Embodiments of the present disclosure characterize one or more obscurants present within an environment, such as one or more obscurants located between an imaging device and one or more targets, and then adjust one or more parameters of the imaging system based on the characterization of the one or more obscurants. The objective of obscurant characterization is to optimize the sensor to receive maximum signal and minimize noise through a set of controllable parameters that collectively condition the sensor to optimally perform. Parameters of the imaging system that may be adjusted include, but are not limited to, spectral (i.e., wavelength parameters), polarimetric, temporal (i.e., exposure time), and spatial.

There are many different methods to characterize obscurants. In one example, the characterization is performed by accessing an obscurant library for selection of one or more obscurants that are most similar to the one or more obscurants currently present within the environment. In another embodiment, one or more obscurants present within an environment are characterized in-situ by an active characterization process. Various methods of charactering one or more obscurants are described in detail below.

Referring once again to FIG. 1, one or more obscurants 130 may be present between an imaging system 110 comprising a sensor 112 (e.g., an image sensor), and a target 140. In one method of obscurant characterization, the imaging system 110 receives one or more inputs corresponding to the obscurant 130. For example, the one or more inputs may be configured as one or more user inputs that are inputted into the imaging system 110, or a component communicatively coupled to the imaging system 110. The one or more inputs may correspond to the type of obscurant that is present within the environment. As a non-limiting example, a user may input that the obscurant 130 is fog, or that the obscurant is a combination of fog and rain.

The one or more inputs may provide additional detail regarding the one or more obscurants 130. For example, the one or more inputs may further include the geolocation of the imaging system (e.g., global positioning coordinates), the time of year, the time of day, the temperature, the humidity, and the atmospheric pressure. These inputs may be inputted by a user, or determined automatically using sensors, internal components, and/or external components (e.g., weather reports, global positioning system data, environmental sensors, and the like). Properties of obscurants may be dependent on these inputs. For example, fog in the morning may behave differently than fog in the evening. Further, fog may behave differently in the South China Sea at 6:00 a.m. in March than fog in the Pacific Ocean at 7:00 p.m. in September.

The imaging system 110 may receive one or more inputs to estimate the properties of the one or more obscurants 130 present within the environment using historical obscurant data stored in a database. The database (e.g., storing obscurant data 38a depicted in FIG. 2) stores a plurality of obscurant characterizations (also referred to herein as "characterized obscurants") based on historical data. For example, various obscurants may be studied over time, and the properties of which may be stored in the database. Information relating to each obscurant may be recorded and stored in the database. Information such as obscurant type, geolocation, the date, the time of day, the temperature, the humidity, the atmospheric pressure, particle size, particle density, and particle composition may be associated with each obscurant characterization. Parameters of the imaging system providing a best signal to noise ratio for each obscurant characterization may also be stored. As a non-limiting example, each obscurant characterization stored in the database may comprising one or more of the following: one or more wavelength parameters (e.g., one or more wavelengths that best propagate through the particular obscurant), one or more polarization parameters (e.g., one or more polarization states that best propagate through the particular obscurant), and one or more exposure time parameters (e.g., one or more exposure times of the imaging system for the particular obscurant).

After receiving the one or more inputs, one or more obscurant characterizations are selected from the database. The one or more selected obscurant characterizations may be the one or more obscurant characterizations that most closely align with the one or more inputs received by the imaging system. As an example and not a limitation, the one or more inputs may indicate that the obscurant is smog in the Pacific Ocean off of the coast of California near Los Angeles on June 20 at 3:00 p.m. local time. The selected obscurant characterization may be smog in the Pacific Ocean off of the coast of California near Los Angeles on Jul. 15, 2016 at 5:00 p.m. local time. Although not an exact match, the selected obscurant characterization may approximately characterize the obscurant that is currently present within the environment and is a starting point for further tuning the parameters for the observed obscurant conditions.

The one or more imaging system parameters associated with the selected obscurant characterization(s) may then be applied to the imaging system 110 so that the signal to noise ratio may be increased, thereby increasing the visibility of the target 140. Additional details regarding adjusting the parameters of the imaging system are described in more detail below.

Figure 3A:
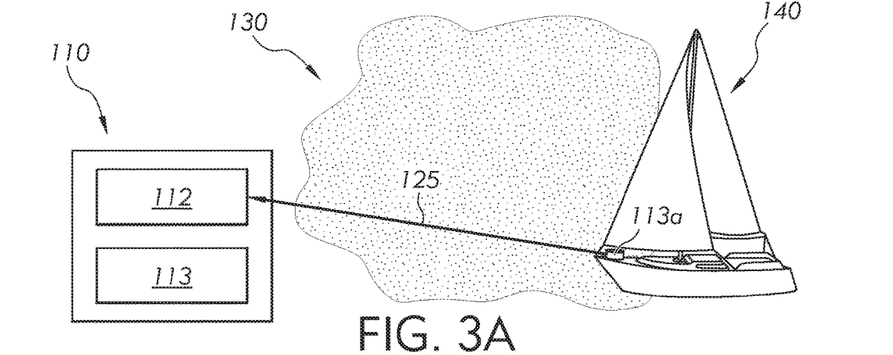
FIGS. 3A-3C schematically depict example imaging systems operable to characterize an obscurant within an environment according to one or more embodiments described and illustrated herein.

Another example method of characterizing the one or more obscurants 130 present within the environment comprises an active, in-situ characterization process that may be performed in conjunction with, or in lieu of, the historical obscurant database described above. In the active characterization process, attributes of the obscurant are actively detected to characterize the obscurant. Several example active characterization processes are described below. Referring now to FIG. 3A, the imaging system 110 includes a sensor 112 (e.g., a focal plane array comprising an array of pixels) and a light source 113a, such as a laser operable to emit a laser beam. It is noted that the imaging system 110 also include a light source 113 proximate a sensor 112. In this example, the light source 113a is disposed on or otherwise associated with a cooperative target 140 or other object. An obscurant 130 is located between the light source 113a and the sensor 112.

The light source 113a is configured to emit a characterization laser beam 125 through the obscurant 130 toward the sensor 112. In some embodiments described herein, the sensor 112 is the image sensor utilized by the imaging system 110 to image the scene as well as to characterize the obscurant. In other embodiments described herein, the sensor 112 includes one or more additional sensors used for obscurant characterization. Such one or more additional sensors of the sensor 112 may be high bandwidth sensors, for example.

The light source 113a is controlled such that the characterization laser beam 125 sweeps across one or more laser beam parameters. In one example, the characterization laser beam 125 sweeps across a plurality of wavelengths as it is emitted into the obscurant 130 and toward the sensor 112. The range of wavelengths provided by the plurality of wavelengths may be any range. As an example and not a limitation, the characterization laser beam 125 may be swept across a wavelength range of 1 μm-18 μm, including end points. For each wavelength of the plurality of wavelengths, an optical power of the characterization laser beam 125 that is transmitted through the obscurant 130 is determined by the sensor 112. The amount of power of optical radiation of the characterization laser beam 125 is indicative of how optical radiation of the particular wavelength propagates through the obscurant 130. A wavelength providing a relatively high optical power for optical radiation of the characterization laser beam 125 more easily passes through the obscurant 130 than a wavelength providing a relatively low optical power for optical radiation of the characterization laser beam received by the sensor 112.

Accordingly, the characterization laser beam 125 is emitted through the obscurant 130 at a plurality of wavelengths. As described in more detail below, one or more spectral filters 115 may be positioned in an optical path of the sensor 112 (see FIG. 8). In this example, the wavelength of the spectral filter disposed in the optical path of the sensor 112 matches the wavelength of the characterization laser beam 125. Thus, only optical radiation having the wavelength of the characterization laser beam 125 reaches the sensor 112. The wavelength(s) providing a maximum optical power as determined by the sensor 112 is selected as the wavelength parameter. Thus, in this embodiment, the optimal optical power is the maximum optical power received.

In addition to, or in lieu of, wavelength, polarization may be a parameter that is utilized to characterize one or more obscurants 130 present within an environment. Referring once again to FIG. 3A, a characterization laser beam 125 having a particular polarization state is emitted by a light source 113a associated with a cooperative target 140 into the obscurant 130 and received by the sensor 112. A polarization state of the characterization laser beam 125 is sequentially changed through a plurality of polarization states as the characterization laser beam 125 is received by the sensor 112. Any number of polarization states may be utilized.

A polarizing filter matching the polarization state of the characterization laser beam 125 is disposed within the optical path of the sensor 112. A polarization state providing a relatively high optical power for optical radiation of the characterization laser beam 125 more easily passes through the obscurant 130 than a polarization state providing a relatively low optical power for optical radiation of the characterization laser beam received by the sensor 112. A polarization state having the maximum optical power is selected as the polarization parameter. Thus, in this embodiment the optical power is the maximum optical power received.

In embodiments, the polarization filters 116 may be provided on a polarization filter wheel, on a sliding arm, or any other device capable of selectively applying different polarization filters within the optical path of the sensor 112. As an example and not a limitation, the plurality of polarization filters 116 may enable the measurement of the Stokes vector, or any other mathematical equivalent to characterize the polarization state of the received signal from the characterization laser beam 125.

Figure 4A:
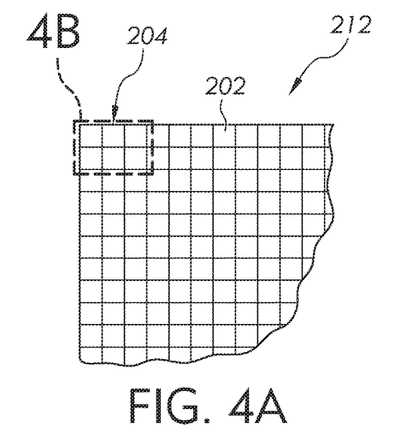
FIGS. 4A and 4B schematically depicts an example polarizing filter disposed on an example sensor according to one or more embodiments described and illustrated herein.
Figure 4B:
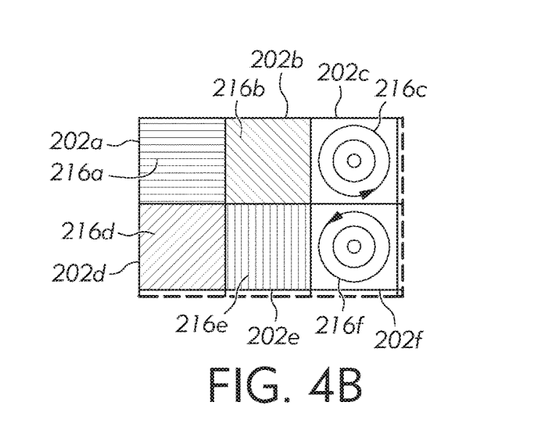
Figure 6:
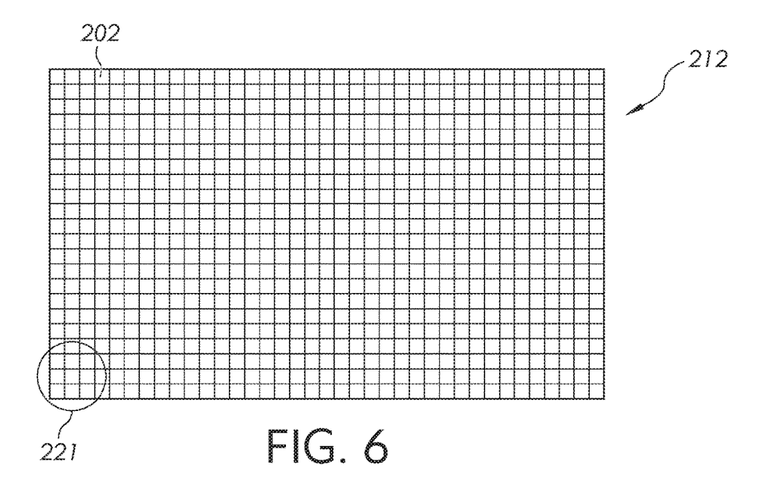
FIG. 6 schematically depicts an example sensor according to one or more embodiments described and illustrated herein.

In yet another example and referring to FIGS. 4A and 4B, in some embodiments, a polarization filter 216 is applied to the pixels 202 of a sensor 212. Each pixel 202 has one polarization filter cell associated therewith. In the non-limiting example, six pixels 202 define a pixel group 204 having polarization states providing the measurement of a Stokes vector (or other mathematical equivalent) for polarization characterization. In FIG. 6, a first pixel 202a has a polarization filter cell 216a with a first linear polarization state, a second pixel 202b has a polarization filter cell 216b with a second linear polarization state, a third pixel 202c has polarization filter cell 216c with a left circular polarization state, a fourth pixel 202d has a polarization filter cell 216d with a third linear polarization state, a fifth pixel 202e has a polarization filter cell 216e with a fourth linear polarization state, and a sixth pixel 202f has a right circular polarization state. In the illustrated embodiment, the first and fourth linear polarization states are orthogonal to one another, and the second and third linear polarization states are orthogonal to one another. Further, the second linear polarization state is negative forty-five degrees with respect to the first linear polarization state, and the third linear polarization state is positive forty-five degrees with respect to the first linear polarization state. The polarization filter 216 may be fabricated and disposed on the sensor 212 by any known or yet-to-be-developed methods.

Optical power received from each pixel 202 within the pixel group 204, and therefore optical power associated within the different polarization states, is determined. From the optical power of the different polarization states, an optimal polarization state associated with the obscurant 130 is derived and selected as the polarization parameter.

Figure 3B:
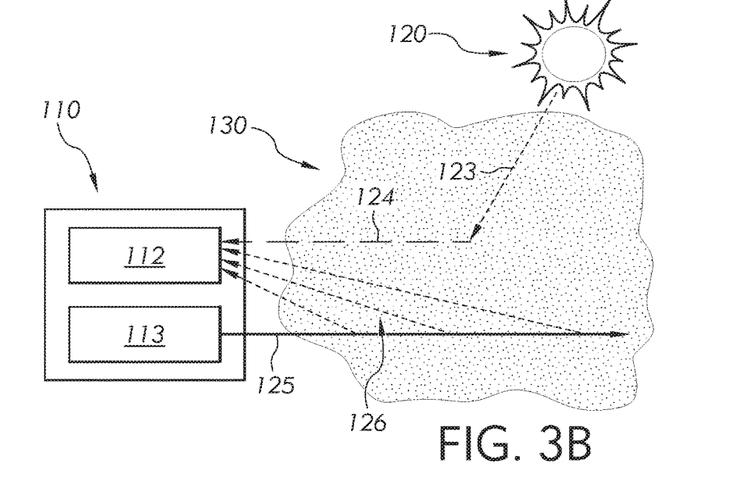

Referring now to FIG. 3B, a process for characterizing an obscurant 130 without a target is schematically illustrated. In this example obscurant characterization process, the light source 113 is controlled to emit a characterization laser beam 125 into one or more obscurants 130. In embodiments, the characterization laser beam 125 may be scanned (e.g., raster scanned) across an area into the one or more obscurants 130. Some optical radiation of the characterization laser beam 125 may be reflected by particles of the obscurant 130 as returned optical radiation 126 that is received by the sensor 112. As noise optical radiation 124 from natural illumination and not from the characterization laser beam 125 may still reach the sensor 112, the light source 113 may be operated in such a way that the noise optical radiation 124 is substantially overwhelmed by the returned signal from the characterization beam.

As described above with respect to FIG. 3A, the light source 113 is controlled such that characterization laser beam 125 sweeps across one or more laser beam parameters. In one example, the characterization laser beam 125 sweeps across a plurality of wavelengths as it is emitted into the obscurant. The range of wavelengths provided by the plurality of wavelengths may be any range. As an example and not a limitation, the characterization laser beam 125 may be swept across a wavelength range of 1 μm-18 μm. Spectral filters are sequentially disposed in front of the sensor 112 such that the wavelength of the spectral filter disposed in front of the sensor matches (i.e., is substantially equal to) the wavelength of the characterization laser beam 125.

For each wavelength of the plurality of wavelengths, an optical power of the returned optical radiation 126 that is reflected by the obscurant 130 is determined by the sensor 112. The amount of power of the returned optical radiation 126 is indicative of how optical radiation of the particular wavelength propagates through the obscurant 130. A wavelength providing a relatively high optical power for returned optical radiation 126 is more readily reflected or scattered by the particular obscurant than a wavelength providing a relatively low optical power for returned optical radiation 126. Thus, the wavelength providing the minimum optical power is selected as the wavelength parameter if scattering is the dominant signal reduction mechanism. Accordingly, in this embodiment the optimal optical power is the minimum optical power received.

Thus, as described in more detail below, one or more spectral filters may be positioned in an optical path of the sensor 112 that allow wavelengths providing a relatively low optical power for returned optical radiation 126 to pass through the one or more spectral filters and reach the sensor 112 when imaging. The one or more spectral filters block wavelengths providing a relatively high optical power for returned optical radiation 126 from reaching the sensor 112.

As further described above with respect to FIG. 3A, in addition to, or in lieu of, wavelength, polarization may be a parameter that is utilized to characterize one or more obscurants 130 present within an environment as shown in FIG. 3B. The polarization state of the characterization laser beam 125 is sequentially changed through a plurality of polarization states as the characterization laser beam 125 is emitted into the obscurant. In one embodiment, a polarization filter 116 is disposed in the optical path of the sensor that matches the polarization state of the characterization laser beam 125. Optical power for each of the polarization states is determined by the sensor 112. The polarization state providing the minimum optical power is selected as the polarization parameter. Thus, in this embodiment, the optimal optical power is the minimum optical power received.

In another embodiment, the polarization filter 216 is disposed directly on the sensor 212, as shown in FIGS. 4A and 4B and described above. Optical power received from each pixel 202 within the pixel group 204, and therefore optical power associated within the different polarization states, is determined. From the optical power of the different polarization states, an optimal polarization state associated with the obscurant 130 is algorithmically derived and selected as the polarization parameter.

Figure 3C:
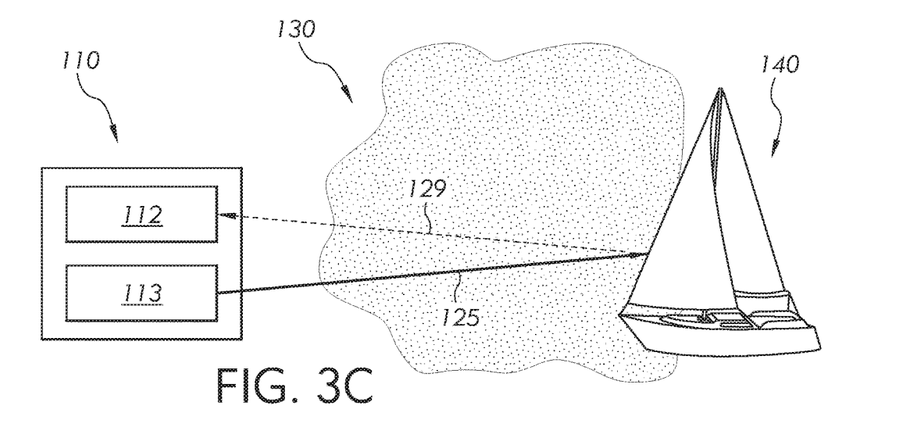

Referring now to FIG. 3C, in another example of in-situ obscurant characterization, a target 140 or other reference object may be present within the scene. When characterizing the obscurant 130, the light source 113 may be controlled to illuminate the target 140. Signal optical radiation 129 is reflected off the target 140. For example, the light source 113 may be controlled to scan a characterization laser beam 125 across the target 140 over a plurality of wavelengths. The characterization laser beam 125 may be mechanically scanned, or scanned by electronic beam steering, for example. As non-limiting examples, the characterization laser beam 125 may be scanned across the target by line scanning or by raster scanning, for example.

As described above with respect to FIGS. 3A and 3B, spectral filters 115 (e.g., see FIG. 8) are disposed in the optical path of the sensor 112 as the wavelength of the characterization laser beam 125 is swept. The wavelength of the spectral filter 115 matches the wavelength of the characterization beam 125. For each wavelength of the characterization laser beam 125, one or more images are created by the sensor. For each image, one or more image quality metrics are determined. One non-limiting example of an image quality metric is contrast. It should be understood that other image quality metrics may be utilized. The image quality metrics for each of the wavelengths of the characterization beam 125 are compared. The wavelength associated with the optimal image quality metric among all of the images is selected as the wavelength parameter. As an example and not a limitation, the wavelength associated with the image having a highest contrast is selected as the wavelength parameter.

As stated above with respect to FIGS. 3A and 3B, in addition to, or in lieu of, wavelength, polarization may be a parameter that is utilized to characterize one or more obscurants 130 present within an environment. As shown in FIG. 3C, a target 140 is present within the scene. In one example, a polarization state of the characterization laser beam 125 is sequentially changed as it is scanned or is otherwise incident on the target 140. The characterization laser beam 125 is reflected by the target 140 and signal optical radiation is detected by the sensor 112.

In one embodiment, a polarization filter 116 is disposed in the optical path of the sensor that either matches the polarization state of the characterization laser beam 125 or in a set of polarizations of the laser beam that fully characterizes the polarization state of the received signal. For each polarization state of the characterization laser beam 125, one or more images are created by the sensor. For each image, one or more image quality metrics are determined (e.g., contrast). The image quality metrics for each of the polarization states of the characterization beam 125 are compared. The polarization state associated with the optimal image quality metric among all of the images is selected as the polarization parameter. As an example and not a limitation, the polarization state associated with the image having a highest contrast is selected as the polarization parameter.

In another embodiment, a polarization filter 216 is disposed on the sensor 212 has shown in FIGS. 4A and 4B. The polarization state of the characterization beam 125 is sequentially changed over a plurality of polarization states. Using the Stokes vector measurement provided by the pixels 202a-202f of the pixel groups 204, data representing optical power of the individual pixels 202 of the pixel group 204 is manipulated to algorithmically apply a polarization filter having a polarization state that is substantially equivalent to the polarization state of the characterization laser beam 125 or a set of the polarization states of the laser beam that fully characterizes the polarization state of the received signal. One or more images for each polarization state of the characterization laser beam 125 are generated. One or more image quality metric are determined for each image. The image quality metrics associated with the polarization states of the characterization laser beam 125 are compared. The polarization state associated with the optimal image quality metric among all of the images is selected as the polarization parameter. As an example and not a limitation, the polarization state associated with the image having a highest contrast is selected as the polarization parameter.

It is noted that the in situ method of characterizing the obscurant 130 using a target 140 or other reference object described above with reference to FIG. 3C may be performed without active illumination using the light source 113 and characterization laser beam 125. For example, a plurality of images applying a plurality of spectral filters and/or polarization filters as described above may be generated without a characterization laser beam 125. One or more image quality metrics are generated for the plurality of images. The wavelength and/or polarization state associated with the image(s) providing the optimal image quality metric(s) may be selected as the wavelength parameter and/or the polarization parameter.

In some embodiments, the obscurant 130 may be characterized both with active illumination (i.e., using a characterization laser beam 125) as shown in FIG. 3C and without active illumination. The image quality metric(s) in each of the illuminated and non-illuminated characterizations may be compared to determine whether active illumination or non-illumination is the better operational approach for imaging the target 140 due to the environment and obscurant 130.

Exposure time of the sensor 112 is another parameter that may be utilized to characterize the obscurant 130. Exposure time may be a relevant parameter for precipitation obscurants, such as fog, rain and/or snow due to the relatively large variation in size of fog precipitation, raindrops or snowflakes. There may be an optimal exposure time or a range of exposure times depending on type of precipitation such that optical radiation may successfully pass through a region of the obscurant without or minimally being blocked or scattered.

The exposure time parameter may be determined using any of the approaches illustrated by FIGS. 3A, 3B, and 3C and described above. It is noted that the exposure time parameter may be determined for individual regions of the environment, as described in more detail below. For example, rain may be present within one region of the environment and not present within another region of the environment. As another example, rain may be falling at a first density and a first velocity in one region and at a second density and a second velocity in another region. Thus, the exposure time parameter may be determined for more than one region of the obscurant 130 and the environment.

The characterization process may comprise imaging a target 140 at a plurality of exposure times. The target 140 may be illuminated by a characterization laser beam 125 as described above. In some embodiments, the characterization laser beam 125 may have the optimal wavelength parameter and the polarization parameter as determined by one or more of the characterization processes described above. Referring to FIG. 3A, optical power of the characterization laser beam 125 received by the sensor 112 is determined. The exposure time providing the maximum optical power is selected as the exposure time parameter. Thus, the optimal optical power is the maximum optical power.

Referring to FIG. 3B, the characterization process may comprise determining the received optical power of the characterization laser beam 125 at a plurality of exposure times. The exposure time providing the minimum received optical power is selected as the exposure time parameter.

Referring to FIG. 3C, the characterization laser beam 125 may be utilized to scan the target 140 or other reference object as described above. The sensor 112 receives returned optical radiation 129 of the characterization laser beam 125. One or more images of the target 140 are determined for each of the exposure times. One or more image quality metrics (e.g., contrast) are determined for each image. The exposure time associated with the optimal image quality metric among all of the images is selected as the exposure time parameter. As an example and not a limitation, the exposure time associated with the image having a highest contrast is selected as the wavelength parameter.

Figure 5:
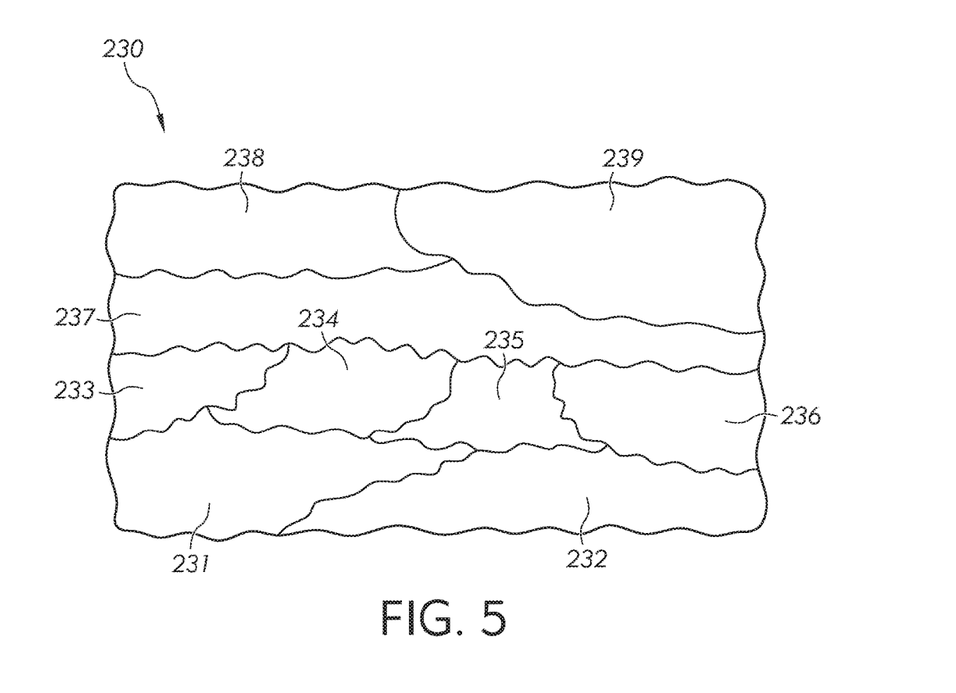
FIG. 5 schematically depicts an example obscurant present within an environment.

As described above, the obscurant(s) 130 present within the environment may be stratified, and thus have a plurality of regions having different properties. FIG. 5 schematically illustrates a cross-sectional view of a non-limiting example obscurant 230 having individual obscurant regions 231-239. It should be understood that FIG. 5 is for illustrative purposes only, and that the obscurant 230 may be viewed from any angle of perspective. Each individual obscurant region 231-239 may affect optical radiation differently. For example, a first wavelength of optical radiation may be ideal in obscurant region 239, but not in obscurant region 231.

Embodiments of the present disclosure may characterize individual regions of one or more obscurants in the environment by detecting optical radiation at the pixel level. FIG. 6 schematically depicts an example sensor 212 comprising an array of pixels 202 (i.e., an array of detector elements). It should be understood that FIG. 6 is provided for illustrative purposes only, and that embodiments are not limited by the number of pixels shown in FIG. 6.

In embodiments, as the light source 113 is controlled to sweep the wavelength of the characterization laser beam 125, each pixel generates a signal based on the amount of optical radiation it receives. Each pixel corresponds to a particular point in the scene. For example, a pixel in the upper left corner of the sensor 212 corresponds to a lower right region of the scene. As each pixel 202 generates an individual signal, the obscurant 230 may be characterized at a fine granularity. Thus, parameters of the imaging system 110 may be adjusted depending on the region(s) of the obscurant 230.

In some embodiments, signals from groups of pixels 202 may be used to characterize the obscurant 230 rather than individual pixels 202. In FIG. 6, a group 221 of nine pixels is illustrated. Although grouping the pixels 202 may reduce the resolution of the characterization of the obscurant, it may increase processing speed and decrease processing demands.

Similar to the spectral characterization described above, polarimetric characterization may be provided at the pixel-level, thereby enabling the polarimetric characterization of individual regions of the obscurant.

It is noted that, in some embodiments, the obscurant characterizations, including the wavelength parameters, the polarization parameters, and/or the exposure time parameters, generated by the in-situ processes described herein may be collected and subsequently utilized for inclusion in the database of historical obscurant data described above. Environmental data surrounding the in-situ obscurant characterizations may also be collected for use in the database, such as, without limitation date, time, temperature, humidity, atmospheric pressure, geolocation, and the like. In this manner, the historical obscurant data may be utilized to create a more robust database.

It is further noted that the lookup characterization process and the in-situ characterization process may be combined when characterizing an obscurant. For example, the database may be accessed to find imaging system parameters that may be used as a starting point for the in-situ process. The obscurant characterizations stored within the database may serve as a starting point for the wavelengths, polarizations and exposure times used to probe the obscurant 130, thereby saving time in the in-situ characterization process.

With the obscurant 130 being characterized, one or more parameters of the imaging system 110 may be adjusted to provide a maximum signal to noise ratio and therefore cause the target 140 to be visible to the imaging system 110. Whether one or more of a wavelength parameter, a polarization parameter and an exposure time parameter corresponding to the obscurant(s) were determined by accessing a database of historical obscurant data or by the in-situ processes described herein, the various parameters may be adjusted.

Figure 7:
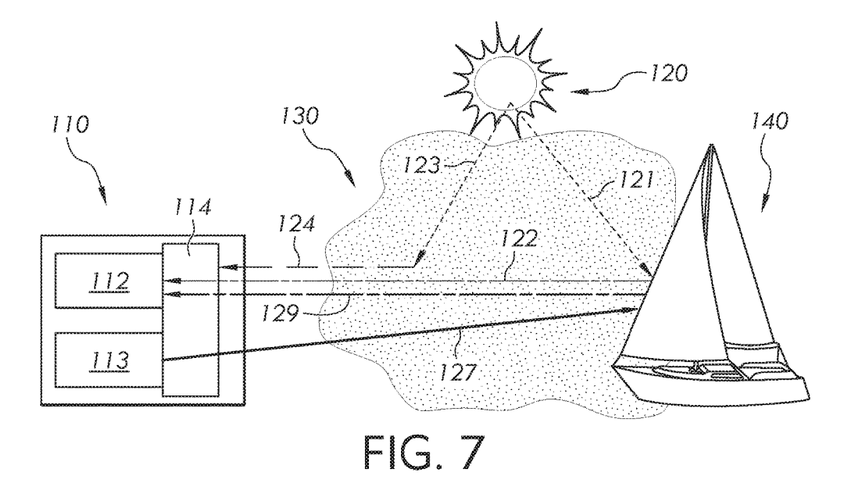
FIG. 7 schematically depicts an example imaging system comprising a conditioner element, a light source, and a sensor according to one or more embodiments described and illustrated herein.
Figure 8:
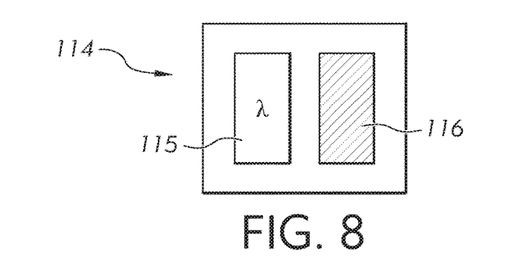
FIG. 8 schematically illustrates an example conditioner element of an example imaging system according to one or more embodiments described and illustrated herein.

Referring now to FIG. 7, one or more parameters of the imaging system 110 may be adjusted by using a conditioner element 114 disposed within an optical path of the sensor 112. Referring to FIG. 8, the conditioner element 114 may include one or more multispectral filters 115 and/or one or more polarization filters 116. It should be understood that only one polarization filter 116 may be disposed within the optical path of the sensor 112 at a time. Each of the one or more multispectral filters 115 and the one or more polarization filters 116 are adjustable so that they may provide the one or more wavelength parameters and/or the one or more polarization parameters as determined during the characterization process. Applying parameters obtained during obscurant characterization, the conditioner element 114 is configured to allow signal optical radiation 122, 128, 129 to pass through the conditioner element 114 and reach the sensor 112, and to block noise optical radiation 124 of the obscurant from reaching the sensor 112.

The adjustable multispectral filter 115 may be configured as any known or yet-to-be-developed adjustable wavelength filter operable to selectively position a desired wavelength filter within an optical path of the sensor 112. In one non-limiting example, the adjustable multispectral filter 115 is configured as a filter wheel having a plurality of wavelength filters. An actuator may rotate the adjustable wavelength filter such that a selected wavelength filter is selectively disposed within an optical path of the sensor 112. In another non-limiting example, the adjustable multispectral filter 115 is configured as a slideable filter having a plurality of wavelength filters that may be selectively inserted and removed from the optical path of the sensor 112 in accordance with one or more wavelength parameters as determined by the obscurant characterization.

It is noted that the wavelength filters may be configured as any wavelength filter depending on the characterization process. For example, an individual wavelength filter may be a low-pass filter, a band-pass filter, a multi-band pass filter, or a high-pass filter that selectively allows optical radiation having the desired wavelengths to reach the sensor 112.

In some embodiments, the pixels of the sensor 112 may be configured as multi-band pixels, wherein a first portion of the substrate of each pixel is operable to detect optical radiation within a first spectral band or a first group of spectral bands, and a second portion of the substrate of each pixel is operable to detect optical radiation within a second spectral band or a second group of spectral bands. As an example and not a limitation, the first wavelength band may be short-wave infrared and the second wavelength band may be longwave infrared. If the wavelength parameter determined by the obscurant characterization phase falls within the first spectral band, the sensor 112 may be controlled to detect optical radiation in the first radiation band using the first portion of the substrate of each pixel. Conversely, if the wavelength parameter determined by the obscurant characterization phase falls within the second spectral band, the sensor 112 may be controlled to detect optical radiation in the second radiation band using the second portion of the substrate of each pixel.

The adjustable polarization filter 116 may be configured as any known or yet-to-be-developed adjustable polarization filter operable to selectively position a desired polarization filter within an optical path of the sensor 112. In one non-limiting example, the adjustable polarization filter 116 is configured as a filter wheel having a plurality of polarization filters. An actuator may rotate the adjustable polarization filter 116 such that a selected polarization filter is selectively disposed within an optical path of the sensor 112. In another non-limiting example, the adjustable polarization filter 116 is configured as a slideable filter having a plurality of polarization filters that may be selectively inserted and removed from the optical path of the sensor 112.

Referring once again to FIGS. 4A and 4B, rather than an adjustable polarization filter that is disposed in the optical path of the sensor 212, the polarization filter 216 may be configured as a static filter disposed on the individual pixels 202 of the sensor 212. As described above, a pixel group 204 may defined by six individual pixels 202a-202f, each individual pixel 202a-202f having an individual polarization filter cell 216a-216f disposed thereon. The linear polarization states of the first and fifth polarization filter cells 216a, 216e are orthogonal to one another, and the linear polarization states of the second and fourth polarization filter cells 216b, 216d are orthogonal to one another. The circular polarizations of the third and sixth polarization filter cells 216c, 216f are orthogonal to one another.

The six polarization filter cells 216a-216f and associated pixels 202a-202f provide a measurement of the Stokes vector (or other mathematical equivalent). A pixel may be constructed from the six pixels 202a-202f by an image processing algorithm such that the polarization filter 216 applies an effective polarization state that matches the polarization parameter of the characterized obscurant.

The exposure time of the sensor 112 may be adjusted by any known or yet-to-be-developed methods. In one non-limiting example, a shutter of the imaging system 110 is controlled to open and close in accordance with the exposure time parameter as determined by the obscurant characterization.

As described above, individual regions of one or more obscurants within a field of view may be characterized. Thus, when imaging a target that is obscured by a particular region of the one or more obscurants, the various imaging system parameters may be adjusted for the characterization of that particular region of interest of the one or more obscurants.

Referring to FIG. 7, in some embodiments, the target 140 is actively illuminated by the imaging system 110. The light source 113 may be controlled to emit a laser beam 127 that illuminates the target 140 (i.e., an illumination beam). As an example and not a limitation, the light source 113 may be controlled to line scan or raster scan the laser beam 127 across the target 140. The laser beam 127 may be mechanically scanned or scanned by electronic beam steering.

The light source 113 may be controlled to emit the laser beam 127 such that it has parameters that enable it to optimally pass through the one or more obscurants 130. Accordingly, the laser beam 127 has parameters in accordance with the various parameters determined during obscurant characterization. For example, the obscurant characterization may indicate that optical radiation having a wavelength within a particular wavelength range optimally pass through the one or more obscurants 130. Therefore, the light source 113 may be controlled to emit the laser beam 127 such that it has a wavelength within such a wavelength range, thereby providing a high signal to noise ratio. Similarly, the obscurant characterization may indicate that optical radiation having a particular polarization state may optimally pass through the one or more obscurants 130. One or more polarization filters (e.g., as schematically illustrated by the conditioner element 114 in FIG. 7) may be disposed in front of the light source 113 such that the laser beam 127 has the optimal polarization state as determined by the obscurant characterization phase, thereby providing a high signal to noise ratio.

Optical radiation from the laser beam 127 is returned to the imaging system 110 as signal optical radiation 129. Optical radiation from natural illumination source 120 is also reflected by the target 140 and returned as signal optical radiation 122.

It should now be understood that embodiments described herein are directed to systems and methods for characterizing an obscurant present within an environment, and selectively adjusting various parameters of an imaging system in accordance with the characterization of the obscurant. By selectively adjusting the various parameters of the imaging system to account for the obscurant, a signal to noise ratio of the imaging system is increased. In some embodiments, a target is actively illuminated by a laser beam that is configured to having parameters based on the characterization of the obscurant such that it may optimally pass through the obscurant.

What is claimed is:

1. A method of imaging a target, the method comprising:
   characterizing at least one obscurant present in an environment;
   determining one or more variables; based on the at least one characterized obscurant, wherein the one or more variables are selected from a group consisting of:
   one or more wavelengths corresponding to the at least one obscurant;
   a polarization state corresponding to the at least one obscurant; and
   a sensor exposure time corresponding to the at least one obscurant; and
   adjusting one or more parameters of an imagining system based at least in part on a characterization of the at least one obscurant.

2. The method of claim 1, wherein the at least one obscurant comprises at least one of snow, rain, fog, clouds, smoke, smog, sand, and dust.

3. The method of claim 1, wherein characterizing the at least one obscurant is performed after receiving a user input comprising a selected obscurant.

4. The method of claim 3, further comprising:
   accessing a database storing a plurality of parameters corresponding to a plurality of obscurant characterizations, wherein each individual obscurant characterization comprises one or more of at least one wavelength parameter, at least one polarization parameter, and at least one exposure time parameter; and
   selecting a selected obscurant characterization corresponding to the selected obscurant.

5. The method of claim 4, wherein, based on the selected obscurant characterization, the method further comprises:
   applying a multispectral filter having a selected wavelength parameter associated with the selected obscurant characterization to filter the wavelength received by a sensor;
   applying a polarization filter having a selected polarization state associated with the selected obscurant characterization to filter the polarization of light received by the sensor; and
   adjusting a sensor exposure time of the sensor in accordance with the selected obscurant characterization.

6. The method of claim 3, wherein the plurality of obscurant characterizations is based at least in part on historical obscurant data.

7. The method of claim 3, wherein characterizing at least one obscurant further comprises receiving a geolocation, a date, a time of day, a temperature, an atmospheric pressure, and a humidity.

8. The method of claim 1, further comprising:
   controlling a light source to emit a beam by sweeping the beam across a plurality of wavelengths;
   selectively applying a spectral filter of a plurality of spectral filters to the sensor corresponding to the plurality of wavelengths;
   detecting, using a sensor, an optical power of returned optical radiation of the beam for individual wavelengths of the plurality of wavelengths of the beam; and
   determining a wavelength of returned optical radiation providing an optimal optical power.

9. The method of claim 8, wherein:
the wavelength of returned optical radiation providing an optimal optical power is determined by individual pixels of the sensor; and
individual pixels of the sensor correspond to individual portions of the at least one obscurant such that individual portions of the at least one obscurant are characterized.

10. The method of claim 1, further comprising:
controlling a light source to emit a beam through the obscurant and onto a target by sweeping the beam across a plurality of wavelengths and selectively applying a spectral filter to the sensor corresponding to the plurality of wavelengths;
for each wavelength of the plurality of wavelengths, generating an image of the target;
for each image of the target, generating an image quality metric; and
selecting the wavelength associated with the image having a highest image quality metric as the wavelength parameter.

11. The method of claim 1, further comprising:
selectively applying a spectral filter of a plurality of wavelengths to the sensor;
for each wavelength of the plurality of wavelengths, generating an image of a target;
for each image of the target, generating an image quality metric; and
selecting the wavelength associated with the image having a highest image quality metric as the wavelength parameter.

12. The method of claim 1, further comprising:
controlling a light source to emit a beam by changing a polarization state of the beam;
selectively applying a polarization filter of a plurality of polarization filters to the sensor corresponding to the plurality of polarizations;
detecting an optical power of returned optical radiation of the beam for individual polarization states of a plurality of polarization states; and
determining a polarization state providing an optimal optical power.

13. The method of claim 12, wherein:
the polarization state providing an optimal optical power is determined by individual pixels of the sensor; and
individual pixels of the sensor correspond to individual portions of the at least one obscurant such that individual portions of the at least one obscurant are characterized.

14. The method of claim 13, wherein the polarization state of the beam is selected from a group consisting of: a circular polarization, a linear polarization, and an elliptical polarization.

15. The method of claim 1, further comprising:
controlling a light source to emit a beam through the obscurant and onto a target by changing a polarization state of the beam across a plurality of polarization states and selectively applying a polarization filter to the sensor corresponding to the plurality of polarization states;
for each polarization state of the plurality of polarization states, generating an image of the target;
for each image of the target, generating an image quality metric; and
selecting the polarization state associated with the image having a highest image quality metric as the polarization parameter.

16. The method of claim 1, further comprising:
selectively applying a polarization filter having a plurality of polarization states to the sensor;
for each polarization state of the plurality of polarization states, generating an image of a target;
for each image of the target, generating an image quality metric; and
selecting the polarization state associated with the image having a highest image quality metric as the polarization parameter.

17. The method of claim 1, further comprising:
controlling a light source to emit a beam;
controlling the sensor to receive returned optical radiation of the beam by sweeping a range of exposure times;
detecting an optical power of returned optical radiation of the beam for an individual exposure time of the plurality of exposure times; and
determining a selected exposure time for one or more regions of interest of a scene providing an optimal optical power.

18. The method of claim 1, further comprising:
controlling a light source to emit a beam;
creating a plurality of images, each image of the plurality of images having a different exposure time;
determining an image quality metric for each image; and
selecting the exposure time associated with the image having a highest image quality metric as an exposure time parameter.

19. The method of claim 1, further comprising:
creating a plurality of images, each image of the plurality of images having a different exposure time;
determining an image quality metric for each image; and
selecting the exposure time associated with the image having a highest image quality metric as an exposure time parameter.

20. The method of claim 1, wherein characterizing at least one obscurant comprises:
controlling a light source to emit a beam by sweeping the beam across a plurality of wavelengths;
detecting, by individual pixels of a sensor, an optical power of returned optical radiation of the beam for individual wavelengths of the plurality of wavelengths of the beam;
determining a wavelength of returned optical radiation providing an optimal optical power among the plurality of wavelengths of the beam;
controlling the light source to emit the beam by sequentially changing a polarization state of the beam;
detecting, by the individual pixels of the sensor, the optical power of returned optical radiation of the beam for individual polarization states of a plurality of polarization states;
determining a polarization state providing an optimal optical power among the plurality of polarization states;
controlling the sensor to receive returned optical radiation by sweeping a range of exposure times;
detecting an optical power of returned optical radiation of the beam for an individual exposure time of the plurality of exposure times; and
determining a selected exposure time for one or more regions of interest of a scene providing an optimal optical power among the plurality of exposure times.

21. The method of claim 1, further comprising controlling a light source to emit an illumination beam, wherein:
the illumination beam has a polarization state corresponding to a polarization parameter of the obscurant; and the illumination beam has a wavelength corresponding to a wavelength parameter of the obscurant.

22. The method of claim 21, further comprising operating the sensor at an exposure time corresponding to an exposure time parameter of the obscurant.

23. The method of claim 22, further comprising controlling the light source such that the illumination beam is scanned across a target.

24. The method of claim 22, further comprising operating the sensor at a plurality of exposure times for a plurality of regions of interest of a scene.

25. The system of claim 1, wherein:
the at least one obscurant that is present within the environment is characterized by an active characterization process; and
a characterization of the at least one obscurant and environmental data surrounding the characterization of the at least one obscurant are stored in a database as historical characterization data.

26. A method of imaging a target, the method comprising:
actively characterizing at least one obscurant present in an environment by illuminating one of a target and an obscurant using a laser beam and detecting reflected light of the laser beam;
determining, based on the at least one characterized obscurant, one or more of the following:
one or more wavelengths corresponding to the at least one obscurant;
a polarization state corresponding to the at least one obscurant; and
a sensor exposure time corresponding to the at least one obscurant; and
adjusting one or more parameters of an imaging system based at least in part on a characterization of the at least one obscurant.

* * * * *